United States Patent
Demas et al.

(10) Patent No.: US 7,454,081 B2
(45) Date of Patent: Nov. 18, 2008

(54) METHOD AND SYSTEM FOR VIDEO EDGE ENHANCEMENT

(75) Inventors: Jason Demas, Irvine, CA (US); Brian Schoner, Fremont, CA (US)

(73) Assignee: Broadcom Corporation, Irvine, CA (US)

(*) Notice: Subject to any disclaimer, the term of this patent is extended or adjusted under 35 U.S.C. 154(b) by 800 days.

(21) Appl. No.: 10/929,628

(22) Filed: Aug. 30, 2004

(65) Prior Publication Data
US 2005/0168644 A1 Aug. 4, 2005

Related U.S. Application Data

(60) Provisional application No. 60/540,818, filed on Jan. 30, 2004.

(51) Int. Cl.
G06K 9/40 (2006.01)
G06K 9/00 (2006.01)
H04N 11/20 (2006.01)
H04N 7/01 (2006.01)

(52) U.S. Cl. ............... 382/268; 382/162; 382/167; 382/266; 382/269; 382/263; 358/426.01; 358/426.16; 348/453

(58) Field of Classification Search ............... 382/266, 382/162, 268, 167, 269
See application file for complete search history.

(56) References Cited

U.S. PATENT DOCUMENTS

| | | | | | |
|---|---|---|---|---|---|
| 4,539,703 | A | * | 9/1985 | Clearman et al. | 382/288 |
| 5,359,437 | A | * | 10/1994 | Hibi | 358/529 |
| 6,192,162 | B1 | * | 2/2001 | Hamilton et al. | 382/266 |
| 6,590,617 | B1 | * | 7/2003 | Kanai et al. | 348/625 |
| 6,628,842 | B1 | * | 9/2003 | Nagao | 382/266 |
| 6,697,535 | B1 | * | 2/2004 | Dutta-Choudhury | 382/266 |

* cited by examiner

*Primary Examiner*—Matthew C. Bella
*Assistant Examiner*—Randolph Chu
(74) *Attorney, Agent, or Firm*—McAndrews, Held & Malloy Ltd.

(57) ABSTRACT

A system and method that enhance edges in images by detecting and correcting edges of the components of the image, such as the luma and the chroma components. The luma and the chroma edges may be corrected to align with one another. The luma edge detection may utilize a combination of the first and second derivatives of luma. The chroma edges may be sharpened by adjusting the saturation of the chroma components, without changing the hue. The luma edges may be corrected using a blend of peaking and enhancing the luma edges. The corrected chroma and luma components may be then debugged and the appropriate corrected components may be sent to display. Chroma/luma edge alignment may utilize a product of the luma first and second derivatives.

27 Claims, 3 Drawing Sheets

METHOD AND SYSTEM FOR VIDEO EDGE ENHANCEMENT

RELATED APPLICATIONS

This patent application makes reference to, claims priority to and claims benefit from U.S. Provisional Patent Application Ser. No. 60/540,818, entitled "Method and System for Video Edge Enhancement," filed on Jan. 30, 2004, the complete subject matter of which is hereby incorporated herein by reference, in its entirety.

This application makes reference to U.S. patent application Ser. No. 10/314,525 filed Dec. 9, 2002, which is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In video and image processing, edges of objects in images and video frames may become blurred for many reasons. For example, NTSC analog broadcasts have limited bandwidth, and as a result, the video content is low-pass filtered, which results in smoothing out the high frequency content and thus softening and blurring the edges. Additionally, transmitting analog video over the air tends to add distortions that may result in some blurring. Digital broadcasts such as, for example, MPEG formatted signals are also bandwidth-limited signals which requires compressing the digital content before transmitting over an analog channel, and the compression often results in loss of high frequency content, and effectively blurring and softening of edges. Quantizing high-frequency discrete cosine transform (DCT) basis functions has a similar effect to low-pass filtering. Also, many MPEG systems sub-sample the original 4:4:4 video to 4:2:2 or 4:2:0 and sub-sampling the original video signal also involves low-pass filtering. Blurring may also be the result of hardware limitations such as, for example, not having enough bits of precision in the processor, which may cause loss of information and as a result cause blurriness in addition to other flaws or imperfections in the images.

Often when images' edges get blurred, they get blurred differently, depending on the characteristics of the communication channel over which they are transmitted. Although, the same content may be sent over two separate communications channels, different video outputs may be produced since different channels may behave differently. When broadcasting videos, the luminance/brightness component may be separated from the chrominance/color component, and while they may be sent together, they are processed differently. It is fairly common to have some small amount of mismatch between the two components. Since the human eye is more sensitive to brightness than it is to color, color information is often band-limited or compressed differently than luminance information. Common problems in video and image processing are that the luma edges and chroma edges often do not line up, and the chroma may be a little blurrier or may get phase shifted more than the luma, and as a result, the overall impression of the image may appear softer and blurrier.

Therefore, it is often desirable to enhance the edge of objects in the images or pictures of a video source. There are several applications and variations thereof used for enhancing edges of objects in images and pictures, some of which may include, sharpening luma edges, sharpening chroma edges, and aligning chroma edges to luma edges. The latter may be referred to as chroma transient improvement (CTI). The disadvantage of using CTI is possibly over emphasizing edges, and since CTI operates only in the horizontal direction, there may be a risk of creating perceptible differences between image characteristics in the vertical and horizontal directions.

Sharpening the edges in an image or a picture is intended to give a perception of crispness, or higher contrast. Since video is ultimately perceptual, there are many human factors to consider. Mathematically correct high-pass filters often cause overshoot or ringing artifacts that are perceptually unpleasant and therefore objectionable, and as a result must be prevented.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be seen in a system and method that enhances edges in images, wherein the images have color components and a brightness component. The method comprises detecting edges in brightness component of an image. The detected edges in the brightness components of the image may be corrected. Edges in each color component of the image may be detected, and the detected edges in each color component of the image may be corrected using a first derivative and second derivative product of the brightness component of the image. A Sobel and LaPlacian kernel may be utilized to determine the first and second derivatives of the brightness component of the image.

Correcting the detected edges in each color component of the image utilizes the detected edges in the brightness component and the detected edges in each color component of the image to determine an amount of correction needed for edges in each color component of the image. The amount of correction is used to select one of a plurality of filters used to correct the detected edges in each color component of the image. Correcting the detected edges in the brightness component of the image comprises peaking the detected edges of the brightness component of the image and enhancing the detected edges of the brightness component of the image, then combining the peaked and enhanced detected edges of the brightness component of the image. The corrected edges in the brightness component and the corrected edges in each color component of the image may be then debugged and displayed.

The system comprises at least one processor capable of performing the method as described hereinabove that enhances edges in images.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain aspects of the present invention may generally relate to the processing of images. More specifically, certain aspects of the present invention relate to a method and system that provide edge enhancements in video content. Although the following discussion describes an embodiment of the present invention in terms of video content, it should be understood that the present invention may be utilized in other applications of image and video processing.

Figure 1:
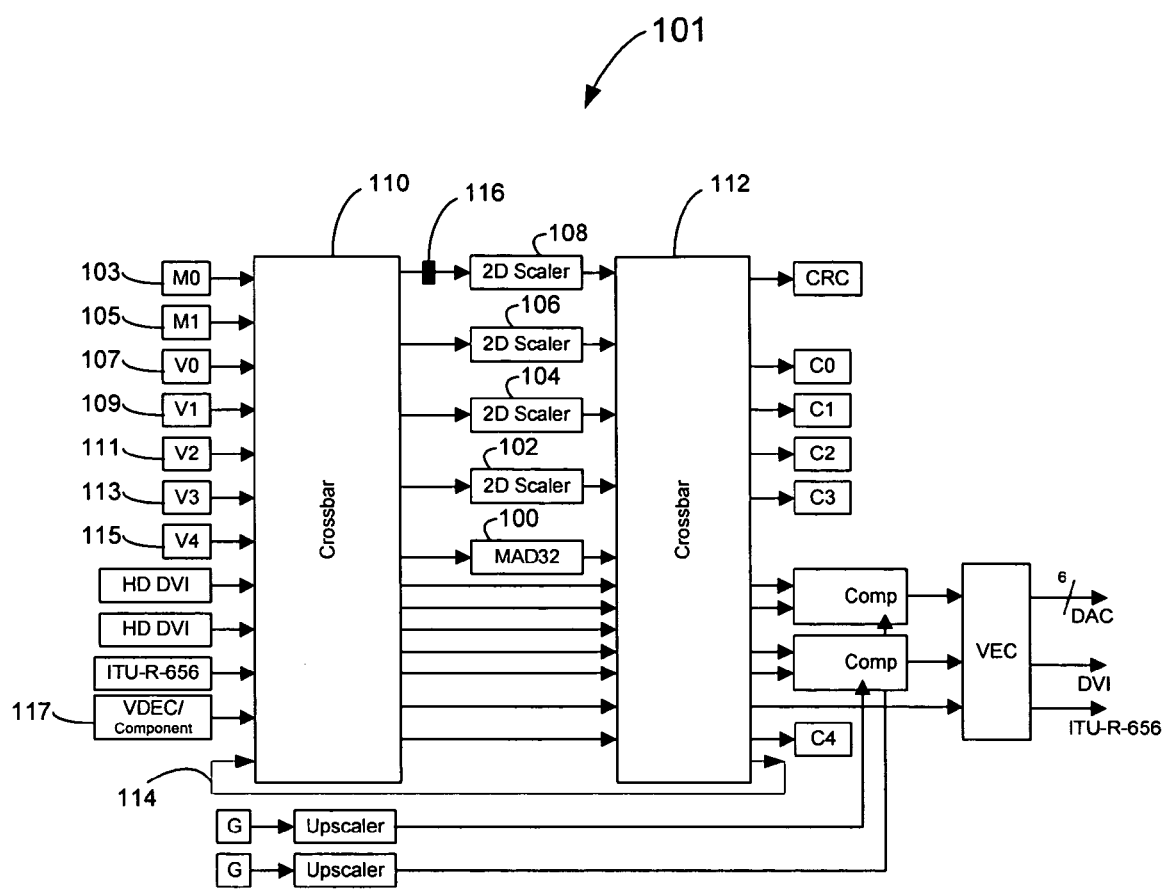
FIG. 1 illustrates a block diagram of an exemplary video network, in accordance with an embodiment of the invention.

An embodiment of the present invention may be utilized in a video network. FIG. 1 illustrates a block diagram of an exemplary video network 101, in accordance with an embodiment of the invention. The video network 101 may contain components such as, for example, a motion adaptive deinterlacer with reverse 3:2 pull-down (MAD32) 100, and a plurality of scalers (102, 104, 106, and 108), which may be positioned between a first crossbar 110 and a second crossbar 112. The first crossbar 110 may be referred to as an input crossbar and the second crossbar 112 may be referred to as an output crossbar.

A feedback path may be provided from the output of the second crossbar 112 to the input of the first crossbar 110. This may allow any of the standard definition (SD) video sources such as the MPEG feeders 103 and 105, video feeders 107, 109, 111, 113 and 115, and/or VDEC 117, and so on, to function as an input to the MAD32 100 and/or one of the scalers 102, 104, 106, and 108. The VDEC 117 may be an analog video decoder that may process NTSC signals to separate color from luma. The MPEG feeders 103 and 105 may accept 4:2:0 and 4:2:2 video data and supply 4:2:2 video data. The video feeders 107, 109, 111, 113 and 115, may accept 4:2:2 video data and supply 4:2:2 video data. The output of the second crossbar 112 may be passed back to the first crossbar 110 via the feedback path 114.

U.S. patent application Ser. No. 10/314,525 filed Dec. 9, 2002 entitled "Network Environment for Video Processing Modules" discloses an exemplary crossbar network module and associated system, which is representative of the video network crossbar that may be utilized in connection with the present invention. Accordingly, U.S. patent application Ser. No. 10/314,525 filed Dec. 9, 2002 is hereby incorporated herein by reference in its entirety.

In accordance with an embodiment of the present invention, a transient adjustment block (TAB) 116 may be utilized to support edge enhancement functions, which may be integrated into, for example, high definition (HD) and/or standard definition (SD) televisions (TVs). One or more techniques may be utilized for enhancing video edges. The TAB 116 may be positioned before a scaler such as, for example, scaler 108, in video network such as, for example, video network 101.

Figure 2:
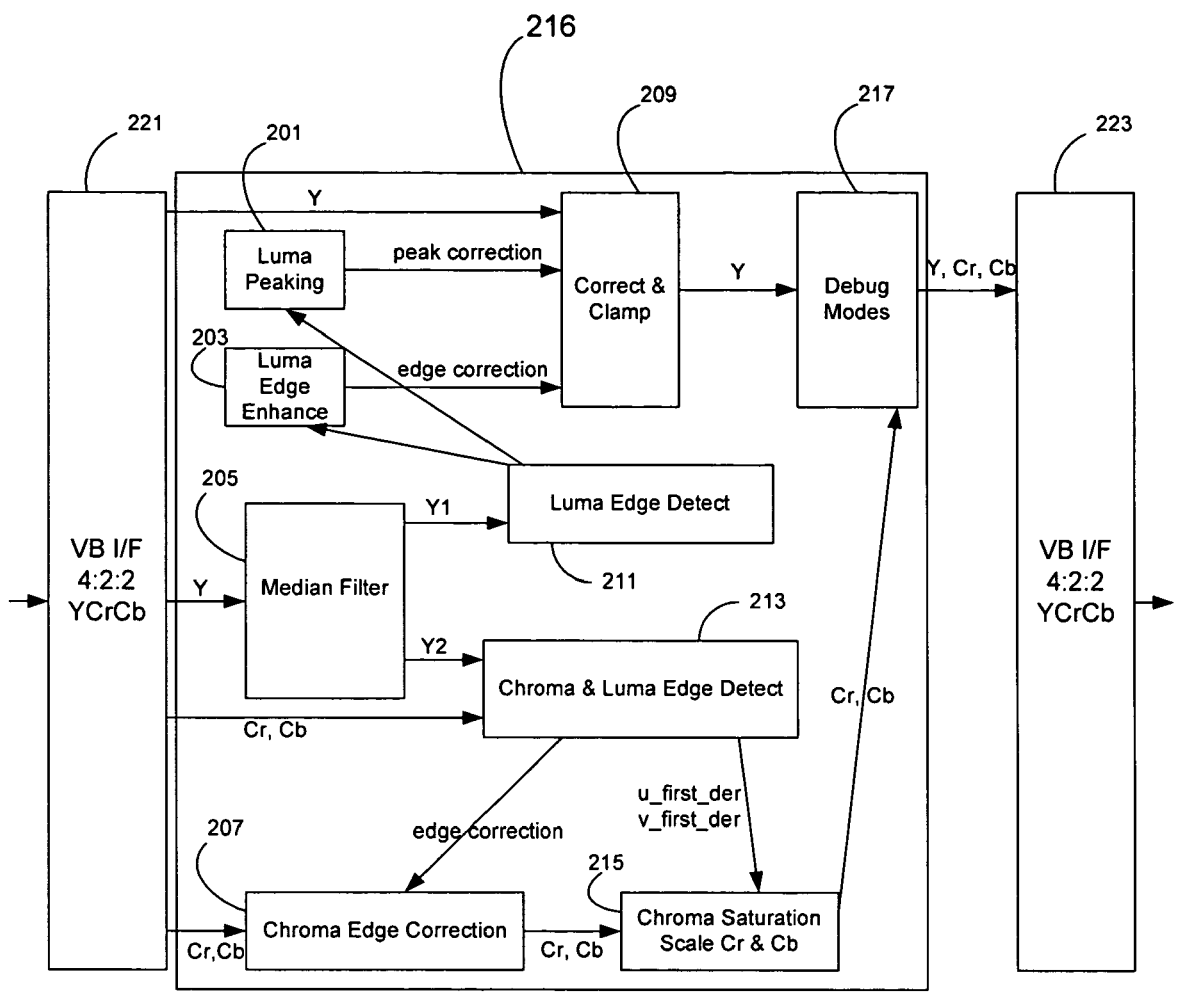
FIG. 2 illustrates a block diagram of an exemplary transient adjustment block (TAB), in accordance with an embodiment of the present invention.

FIG. 2 illustrates a block diagram of an exemplary TAB 216, in accordance with an embodiment of the present invention. The TAB 216 may comprise a luma peaking block 201, a luma edge enhance block 203, a median filter 205, a chroma edge correction block 207, a correct and clamp block 209, a luma edge detect block 211, a chroma and luma edge detect block 213, a chroma saturation block 215, and a debug modes block 217. The functions performed by the blocks of the TAB 216 may be realized using hardware, software, or a combination thereof. The TAB 216 may be connected to a video network through the interfaces 221 and 223.

The input and output of the TAB 216 may be video images in, for example, 4:2:2 $YC_rC_b$ format. In an embodiment of the present invention, the TAB 216 may have a complete bypass from input to output, and the input may go through the TAB 216 unchanged and be output to the video network.

The TAB 216 may operate on the video content one image at a time. The TAB 216 may operate on an image pixel-by-pixel horizontally, which may be read in a raster scan manner. The pixels at the boundaries of an image may be repeated when the TAB 216 utilizes a function or filter that may extend beyond the boundaries of the image.

The luma Y of the input may be input into the median filter 205. The median filter 205 may be a selectable 1-tap, 3-tap, or 5-tap median filter. The median filter 205 may be adapted to filter out noise and may also be used for luma and chroma processing as described hereinafter. The median filter 205 may be a smoothing filter used to prevent the circuit from enhancing spot noise.

The luma edge detection block 211 and the chroma and luma edge detection block 213 may monitor the incoming $YC_rC_b$ data and search for edges. Based on the search, vertical edges may be detected. Edges may be monitored in both the luma and the chroma components, and the results may be sent to other blocks in the TAB 216 such as, for example, the chroma edge correction block 207, for processing.

The luma edge detection block 211 and the chroma and luma edge detection block 213 may calculate the luma first and second derivatives, Y' and Y", respectively. The luma edge detection block 211 may receive the luma Y as an input. The first derivative Y' may be calculated using, for example, the Sobel kernel [−1 0 1]. The first derivative may be calculated for the current pixel, and for the pixel to the left and the pixel to the right of the current pixel, the values of which may be used in processing in other blocks in the TAB 216. The first derivatives may be calculated as follows using the Sobel kernel, where value_y[n] is the value of the current pixel, value_y[n−1] is the value of the pixel to the left of the current pixel, value_y[n+1] is the value of the pixel to the right of the current pixel, and so on:

*first_der_left=value_*y[n−2]*−value_*y[n]*;*

*first_der=value_*y[n−1]*−value_*y[n+1]*; and*

*first_der_right=value_*y[n]*−value_*y[n+2]*.*

The second derivative may be calculated using, for example, a standard Laplacian as follows:

second_der=−value_y[n−1]+2*value_y[n]−value_y[n+1].

Figure 3:
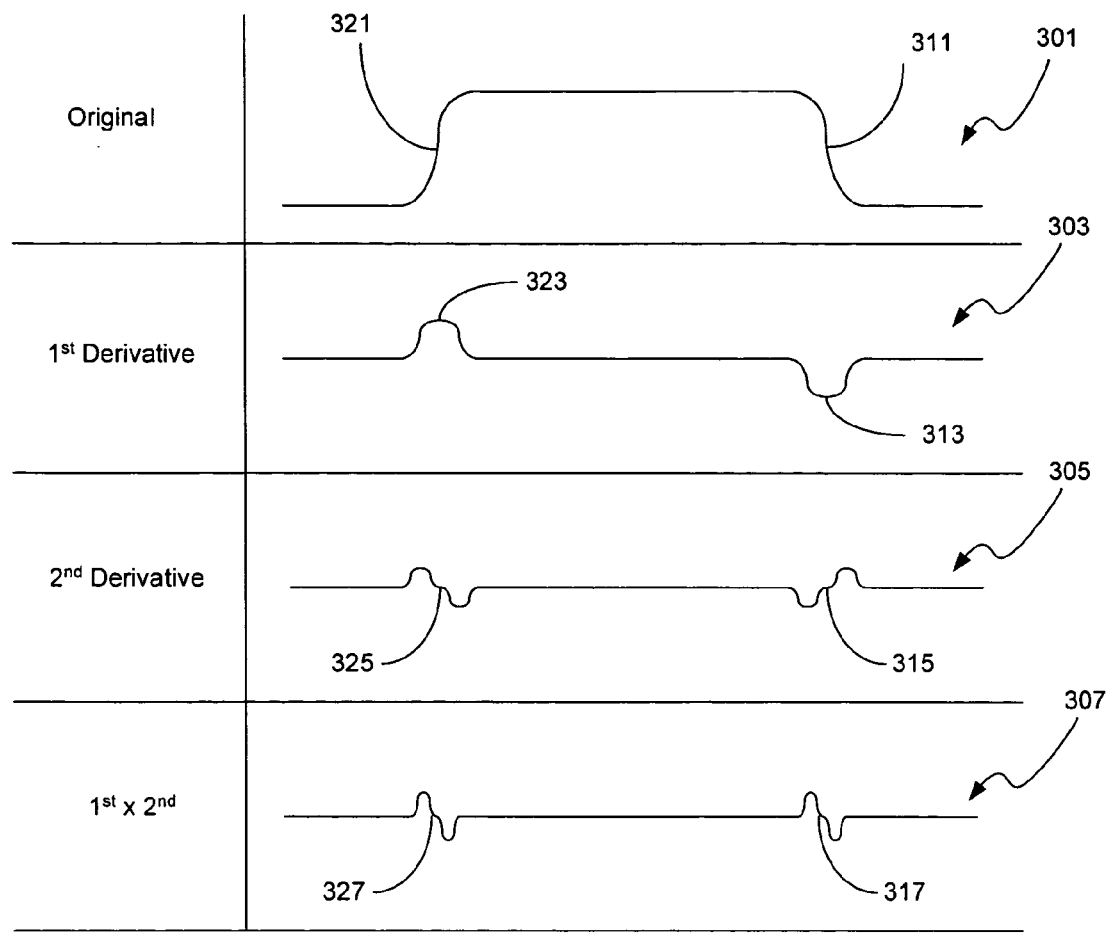
FIG. 3 illustrates first and second derivatives plots associated with an exemplary edge, in accordance with an embodiment of the present invention.

The luma edge detection block 211 may utilize the first and second derivatives of the luma to detect edges. FIG. 3 illustrates first and second derivatives plots associated with an exemplary edge, in accordance with an embodiment of the present invention. The original signal 301 may have two edges 311 and 321. The first derivative 303 may give two peaks 313 and 323 indicating the location of the edge 311 and 321, respectively, in the original signal 301. Taking the second derivative 305 then yields a zero 315 and 325 at the location of the two peaks 313 and 323, respectively, of the first derivative 303, indicating the location of the edge 311 and 321, respectively, in the original signal 301. Using the second derivative 305 by itself to indicate whether a current pixel is on the left or the right, positive or negative, may not yield accurate results, since large edges may have large transition regions, and as such may yield a larger flat region where the second derivative is zero. The improvement to the edge may be needed in a small portion in the middle of the flat region, and multiplying the first derivative 303 by the second derivative 305 may yield a resulting plot 307, where the flat region may be reduced to a small location 317 and 327 within which the edge where the enhancement may be needed may be located. Additionally, in the plot 307 of the product of the first derivative and the second derivative, when a pixel is in the region where the product is positive, then the pixel is to the left of an edge, and when the pixel is in the region where the product is negative, then the pixel is to the right of the edge.

Referring to FIG. 2, the chroma and luma edge detection block 213 may receive the luma Y as an input, and the $C_r$ and $C_b$ values. The outputs of the luma edge detection block 211 and the chroma and luma edge detection block 213 may be used by the chroma edge correction block 207. The chroma edge correction block 207 may also receive as an input the $C_r$ and $C_b$ values.

The chroma edge correction block 207 may enhance the chroma edges. The luma edge detection block 211 and the chroma and luma edge detection block 213 may provide information regarding the strength of the edge associated with the current pixel, whether the current pixel is to the left or right of the edge, and how close the current pixel is to the center of the edge. The chroma edge correction block 207 may process incoming pixels every other sample when the content is in the 4:2:2 space, and every sample if the content is in the 4:4:4 space. The chroma and luma edge detection block 213 may provide to the chroma edge correction block 207 the luma edge (edge_y), the $C_r$ edge (edge_u) and the $C_b$ edge (edge_v). The values for edges may be calculated as follows:

```
y_first_der may use [-1, -1, 0, 1, 1];      // first derivative of Y
y_second_der may use [-1, 0, 2, 0, -1];     // second derivative of Y
u_first_der may use [-1, 0, 1];             // first derivative of C_r
u_second_der may use [-1, 2, -1];           // second derivative of C_r
v_first_der may use [-1, 0, 1];             // first derivative of C_b
v_second_der may use [-1, 2, -1];           // second derivative of C_b
edge_y = (y_second_der * (-1 * y_first_der))/4;
edge_u = (u_second_der * (-1 * u_first_der)); and
edge_v = (v_second_der * (-1 * v_first_der)).
```

The parameters edge_y, edge_u, edge_v may then be combined to determine the amount of edge correction that may be needed:

```
if (disable_chroma_luma) {edge_y = 0;}
if (disable_chroma_chroma) {edge_u = 0; edge_v = 0;}
edge_correction – (edge_y + edge_u + edge_v)/64;
``` where disable_chroma_luma may be a one-bit value indicating whether chroma and luma edges need to be aligned, and "1" may disable chroma alignment to luma edges. Similarly, disable_chroma_chroma may be a one-bit value indicating whether chroma edges need to be aligned, and "1" may disable chroma alignment to chroma edges. And edge_correction may be the amount of chroma edge correction needed.

The value of the edge_correction may then be used to choose one of eight filters to correct the values of $C_r$ and $C_b$ such that the edge of the chroma may get aligned with the luma edge. The filters used in the chroma edge correction block 207 may be 5-tap filters, and the coefficients of the filters may be programmable.

The chroma edge correction block 207 may then apply the appropriate filter to get $C_r$ and $C_b$ values that enhance the chrominance resolution by improving edges at chrominance transitions. The filter applied by the chroma edge correction 207 may be configured so that when an edge is not detected near a current pixel, the filter used may be one that has a center tap with some positive value, and zeros for the rest of the taps, and as such, the pixel may go through unchanged. Then, when an edge is detected to the right of the current pixel, i.e. the current pixel may be to the left of the edge, the taps of the filter may have more weight to the right of the center tap, and as a result the chroma may be pushed more to the right, thereby sharpening the chroma edge. The luma edge may be also corrected in a similar fashion. The resulting luma and chroma components may be blended together to get the desired overall edge enhancement effect.

The chroma edge correction block 207 may then output the corrected values for $C_r$ and $C_b$, which may be the input to the chroma saturation block 215. The chroma saturation block 215 may also receive as inputs, the first derivatives for the chroma values, u_first_der and v_first_der, from the chroma and luma edge detection block 213.

The chroma edge correction block 207 may scale the $C_r$ and $C_b$ values by the same scaling factor. As a result, the color may be saturated at the edges without changing the hue. This may be visibly better than processing the Cr and Cb values independently, which may cause changing the hue at the edges, and be visibly objectionable.

In an embodiment of the present invention, the chroma saturation function may have a range of values for the chroma saturation. A maximum value within the range of chroma saturation values may be programmable. The chroma saturation function may produce the new saturated $C_r$ and $C_b$ values.

In an embodiment of the present invention, a chroma clamp function may be utilized to check for overflow or underflow in the corrected chroma values. The chroma clamp function may control the values of the chroma components utilizing a maximum chroma and minimum chroma values. For example, if the new chroma value is less than a minimum chroma value, the chroma clamp function may force the chroma value to the minimum value, and similarly, if the new chroma value is greater than a maximum chroma value, the chroma clamp function may force the chroma value to the maximum value.

The chroma saturation block 215 may then output the new $C_r$ and $C_b$ values, which may be input into the debug modes block 217.

The luma edges may be sharpened using a blend of peaking and edge enhancement. The output of the luma edge detection block 211 may be input into the luma peaking block 201 and the luma edge enhance block 203. The luma peaking block 201 may provide a filter that enhances the high frequency terms, and as such sharpens the edges, without cutting out or affecting other frequency terms, for example, the DC values remain at DC. The overall effect of the filter in the luma peaking block 201 may be to undo the effects of blurring, which may have been the result of low-pass filtering that may have attenuated some high frequency terms.

The luma peaking block 201 may utilize the second derivative of the luma, which it may receive from the luma edge detection block 211. The luma peaking block 201 may peak values of the luma to give an effect of a sharper edge. For example, at an edge the luma may be higher on one side of the edge and lower on the other side, and hence, if the colors around the edge were gray the one with the higher luma value would look lighter than the other. The luma peaking block 201 may make the higher luma value higher and the lower luma value lower, and as such the lighter gray side would become lighter and the darker gray side would become darker, and effectively, the edge become sharper. The luma peaking block 201 may calculate the corrected peaking values as follows:

```
peak_correction=second_der*PEAK_SETTING;
    //needed peak correction amount
peak_correction>>=PEAK_SCALE;
if(abs(peak_correction)<PEAKCORE)    {peak_correc-
    tion=0;}
``` where PEAK_SETTING ranges in value between [0,15] and may control the amount of peaking, where "0" may disable peaking. PEAK_SCALE may be one of [1,2,3,4], and PEAK-CORE may be a value between [0,255] and may indicate the coring value for peaking.

The luma edge enhance block 203 may use the first derivative of the luma, which it may receive from the luma edge detection block 211. The luma edge enhance block 203 may add enhancement to the side of the edge with the larger luma value. The following code fragment may utilize the first derivative of the luma to verify that the side of the edge with the larger luma value is enhanced:

```
if (first_der > 0) {
        edge_correction = abs(first_der_right);
} else {
        edge_correction = abs(first_der_left);
Scale & core:
    edge_correction *= EDGE_SETTING;
    edge_correction >>= EDGE_SCALE;
    if (edge_correction < EDGECORE) {edge_correction = 0;}
    if (edge_correction > EDGEMAX) {edge_correction =
        EDGEMAX;}
``` where EDGE_SETTING ranges in value between [0,15] and may control the amount of edge enhancement, where "0" may disable enhancement. EDGE_SCALE may be one of [1,2,3,4,5,6], and EDGECORE may be a value between [0,255] and may indicate the coring value for edge enhancement. EDGE-MAX may set the maximum edge enhancement and may be a value in the range [0,255].

The luma peaking and the luma edge enhancement may then be blended together in the correct and clamp block 209, to get the new and correct luma value. The blending may be done by first applying peak correction as follows:

```
new_luma=original_luma+peak_correction;
``` overshoot and undershoot may be limited relative to neighboring pixels, and clamped as follows:

```
max_luma = max(value_y[n-1], value_y[n], value_y[n+1]) +
    OVERSHOOT;
if (new_luma > max_luma) {new_luma = max_luma}
min_luma = min(value_y[n-1], value_y[n], value_y[n+1]) -
    OVERSHOOT;
if (new_luma < min_luma) {new_luma = min_luma}
```

Edge correction may then be applied as follows:

```
new_luma+=edge_correction.
```

The new_luma may then be clamped to get the final new_luma value. Overshoot/undershoot may be controlled by a shoot setting with a value in the range [0,255], where "0" means no overshoot.

The new luma value may then be output by the correct and clamp block 209 and input into the debug modes block 217. The debug modes block 217 may also receive the new chroma ($C_r$ and $C_b$) values from the chroma saturation block 215. The debug modes block 217 may check the new luma and chroma values and display an error term or an edge map based on the results. The error term may be displayed by forcing the $C_r$ and $C_b$ values to zero, hence forcing the chroma to gray, and forcing Y to display:

$$Y=(128+\text{original\_luma}-\text{new\_luma});$$

the resulting luma value may then be clamped to the range [1,254]. The edge map may be displayed by forcing the $C_r$ and $C_b$ values to zero, hence forcing the chroma to gray, and forcing Y either to 1 if the error term is equal to zero, or to 254 if the error term is not equal to zero.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method that enhances edges in images, wherein the images have chroma components and a luma component, the method comprising:
   detecting edges in the luma component of an image;
   correcting the detected edges in the luma components of the image;
   detecting edges in each chroma component of the image; and
   correcting the detected edges in each chroma component of the image using the product of the first derivative and the second derivative of the luma component of the image.

2. The method according to claim 1 further comprising utilizing Sobel and LaPlacian kernels to determine the first and second derivatives of the luma component of the image.

3. The method according to claim 1 wherein the correcting of the detected edges in each chroma component of the image utilizes the detected edges in the luma component and the detected edges in each chroma component of the image to determine an amount of correction needed for edges in each chroma component of the image.

4. The method according to claim 3 further comprising selecting at least one of a plurality of filters to correct the detected edges in each chroma component of the image.

5. The method according to claim 4 further comprising correcting of the detected edges in each chroma component of the image utilizing the same amount of correction.

6. The method according to claim 5 further comprising saturating the corrected edges in each chroma component so that the chroma components are changed by the same amount of correction.

7. The method according to claim 1 wherein the correcting of the detected edges in the luma component of the image comprises:
peaking the detected edges of the luma component of the image; and
enhancing the detected edges of the luma component of the image.

8. The method according to claim 7 wherein the correcting of the detected edges in the luma component of the image further comprises combining the peaked and enhanced detected edges of the luma component of the image.

9. The method according to claim 1 further comprising:
debugging the corrected edges in the luma component and the corrected edges in each chroma component of the image; and
displaying the corrected edges in the luma component and the corrected edges in each chroma component of the image.

10. A system that enhances edges in images, wherein the images have chroma components and a luma component, the system comprising:
at least one processor capable of detecting edges in the luma component of an image;
the at least one processor capable of correcting the detected edges in the luma components of the image;
the at least one processor capable of detecting edges in each chroma component of the image; and
the at least one processor capable of correcting the detected edges in each chroma component of the image using the product of the first derivative and the second derivative of the luma component of the image.

11. The system according to claim 10 wherein the at least one processor uses Sobel and LaPlacian kernels to determine the first and second derivatives of the luma component of the image.

12. The system according to claim 10 wherein the at least one processor utilizes the detected edges in the luma component and the detected edges in each chroma component of the image to determine an amount of correction needed for edges in each chroma component of the image.

13. The system according to claim 12 wherein the at least one processor selects at least one of a plurality of filters used to correct the detected edges in each chroma component of the image.

14. The system according to claim 13 wherein the at least one processor utilizes the same amount of correction to correct the detected edges in each chroma component of the image.

15. The system according to claim 14 wherein the at least one processor saturates the corrected edges in each chroma component so that the chroma components are changed by the same amount of correction.

16. The system according to claim 10 wherein to correct the detected edges in the luma component of the image the at least one processor:
peaks the detected edges of the luma component of the image; and
enhances the detected edges of the luma component of the image.

17. The system according to claim 16 wherein the at least one processor combines the peaked and enhanced detected edges of the luma component of the image to correct detected edges in the luma component of the image.

18. The system according to claim 10 wherein the at least one processor:
debugs the corrected edges in the luma component and the corrected edges in each chroma component of the image; and
displays the corrected edges in the luma component and the corrected edges in each chroma component of the image.

19. A computer readable medium having stored thereon, a computer program having at least one code section that enhances edges in images, the at least one code section being executable by a computer for causing the computer to perform steps comprising:
detecting edges in the luma component of an image;
correcting the detected edges in the luma components of the image;
detecting edges in each chroma component of the image; and
correcting the detected edges in each chroma component of the image using the product of the first derivative and the second derivative of the luma component of the image.

20. The computer readable medium according to claim 19 further comprising code for utilizing Sobel and LaPlacian kernels to determine the first and second derivatives of the luma component of the image.

21. The computer readable medium according to claim 19 wherein code for correcting of the detected edges in each chroma component of the image utilizes the detected edges in the luma component and the detected edges in each chroma component of the image to determine an amount of correction needed for edges in each chroma component of the image.

22. The computer readable medium according to claim 21 further comprising code for selecting at least one of a plurality of filters to correct the detected edges in each chroma component of the image.

23. The computer readable medium according to claim 22 further comprising code for correcting of the detected edges in each chroma component of the image utilizing the same amount of correction.

24. The computer readable medium according to claim 23 further comprising code for saturating the corrected edges in each chroma component so that the chroma components are changed by the same amount of correction.

25. The computer readable medium according to claim 19 wherein the code for correcting of the detected edges in the luma component of the image comprises:
code for peaking the detected edges of the luma component of the image; and
code for enhancing the detected edges of the luma component of the image.

26. The computer readable medium according to claim 7 wherein the code for correcting of the detected edges in the luma component of the image further comprises code for combining the peaked and enhanced detected edges of the luma component of the image.

27. The computer readable medium according to claim 19 further comprising:

code for debugging the corrected edges in the luma component and the corrected edges in each chroma component of the image; and code for displaying the corrected edges in the luma component and the corrected edges in each chroma component of the image.

* * * * *